(12) United States Patent
Mizue et al.

(10) Patent No.: US 7,367,720 B2
(45) Date of Patent: May 6, 2008

(54) OPTICAL TRANSCEIVER WITH OPTICAL SUBASSEMBLIES OPTIONALLY FIXED TO HOUSING

(75) Inventors: Toshio Mizue, Yokohama (JP); Manabu Ishikawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/374,422

(22) Filed: Mar. 14, 2006

(65) Prior Publication Data

US 2006/0215970 A1 Sep. 28, 2006

Related U.S. Application Data

(60) Provisional application No. 60/661,509, filed on Mar. 15, 2005.

(51) Int. Cl.
*G02B 6/255* (2006.01)

(52) U.S. Cl. .............................. 385/92; 385/88; 385/89; 385/90; 385/91; 385/93; 385/55; 385/69; 385/70; 385/72; 385/14; 385/15; 398/135; 398/138; 398/139

(58) Field of Classification Search ............ 385/88–93, 385/69–70, 72, 55, 14–15; 398/135, 138–139; 439/372
See application file for complete search history.

(56) References Cited

U.S. PATENT DOCUMENTS

| 5,329,604 | A | * | 7/1994 | Baldwin et al. ............... 385/92 |
| 6,884,097 | B2 | | 4/2005 | Ice |
| 6,884,997 | B2 | | 4/2005 | Kashima et al. |
| 6,935,882 | B2 | * | 8/2005 | Hanley et al. ............... 439/372 |
| 6,974,260 | B2 | * | 12/2005 | Scheibenreif et al. ......... 385/55 |
| 7,114,857 | B1 | * | 10/2006 | Kayner et al. ................ 385/88 |
| 2005/0180754 | A1 | | 8/2005 | Mizue et al. |

* cited by examiner

*Primary Examiner*—Frank G. Font
*Assistant Examiner*—Guy G Anderson
(74) *Attorney, Agent, or Firm*—Smith, Gambrell & Russell, LLP

(57) ABSTRACT

The present invention provides an optical transceiver with an optical subassembly optically coupling with an optical connector via a receptacle member, in which the optical subassembly is positioned to the housing of the transceiver without causing any mechanical stress. The optical subassembly is fixed to the receptacle member by inserting a sleeve thereof into an opening of the receptacle member. The receptacle member is assembled with the housing via the holder by adjusting the positional relation between the holder and the housing. Therefore, even when the subassembly is fixed to the receptacle member via the sleeve thereof, the subassembly can fit to the housing without causing any mechanical stress because the holder is interposed therebetween, which secures the heat dissipating path from the optical subassembly to the housing.

12 Claims, 7 Drawing Sheets

OPTICAL TRANSCEIVER WITH OPTICAL SUBASSEMBLIES OPTIONALLY FIXED TO HOUSING

CROSS REFERENCE TO RELATED APPLICATION

The present application claims benefit of prior U.S. Provisional Application 60/661,509, entitled "OPTICAL MODULE HAVING AN OPTICAL RECEPTACLE ADJUSTABLE IN ITS POSITION TO A MODULE BODY," filed Mar. 15, 2005; and closely relates to a prior application Ser. No. 10/777,766, entitled "OPTICAL TRANSCEIVER HAVING AN OPTICAL RECEPTACLE OPTIONALLY FIXED TO A FRAME."

BACKGROUND OF THE INVENTION

1. Field of the Invention

The present invention related to an optical transceiver, in particular, the invention relates to a structure of the optical transceiver that secures the heat dissipating capability of an optical subassembly installed within the optical transceiver.

2. Related Prior Art

The optical transceiver can operate in the optical transmission and the optical reception by inserting an optical connector into an optical receptacle of the transceiver to couple an optical fiber in the optical connector in optical with an optical devices installed in the transceiver. This optical coupling may be performed by inserting a ferrule provided in a tip of the optical fiber into a sleeve accompanied with the optical device.

The United States Patent, U.S. Pat. No. 6,884,997, has disclosed an optical transceiver, which integrally builds a housing for enclosing a transmitting optical subassembly (TOSA), a receiving optical subassembly (ROSA), and a substrate, with an optical receptacle for receiving an optical connector. The optical connector widely used in the optical communication apparatus has a standard that strictly rules, for instance, the position of the ferrule within the connector housing and the geometrical relation between the ferrule and the sleeve mating with the ferrule in order to couple the optical fiber attached to the connector with the optical device conjunct with the sleeve.

On the other hand, in the subassembly including the sleeve and the package that holds the sleeve and installs the optical device therein, the positional relation between the sleeve and the optical device is aligned by practically (1) inserting the optical fiber into the sleeve, (2) guiding light within the optical fiber and (3) aligning the position of the sleeve with respect to the optical device. This optical alignment generally does not take the positional relation between the sleeve and the package into account. For example, when the package has the so-called butterfly type with a box shape and the sleeve is attached to one side wall of the package, the precise position of the sleeve in the side wall thereof is taken no thought. The optical alignment between the sleeve, namely, the optical fiber, and the device has the first priority. Accordingly, the sleeve is occasionally attached to a point in the side wall offset from the designed position. Thus, when such subassembly is installed within the transceiver, although the sleeve thereof is precisely positioned to the receptacle, which is formed as a part of the transceiver housing, the package of the subassembly is not always positioned to the housing accurately.

The optical transceiver for the long reach communication or for the wavelength division multiplex (WDM) communication is necessary to control a temperature of the laser diode (LD) to stabilize the emission wavelength thereof. Therefore, the subassembly applied in such optical transceivers installs a thermoelectric controller such as Peltier device within the package. The Peltier device with two plates has a feature that, when one plate thereof is cooled down, the other plate is heated up. Since the LD generates heat due to the current flowing, the LD is mounted on the plate to be cooled down, while the other plate is attached to the package, generally the bottom of the package to radiate heat outward. Therefore, the bottom of the package is necessary to come in contact to some objects to enhance the heat dissipating function.

The pluggable transceiver, which is one type of the optical transceiver and has an essential feature to be inserted into or removed from the cage, is unable to provide a heat dissipating mechanism such as heat radiating fin in the housing because such mechanism may interfere the insertion/extraction function of the transceiver with to the cage. Only the housing body itself is left to dissipate heat from the inside thereof to the outside. Accordingly, in the transceiver installing the subassembly with the box-shaped package and the thermoelectric cooler therein, one outer wall, to which the thermoelectric cooler is attached, is necessary to fit to the housing of the transceiver.

However, as mentioned previously, the position of the subassembly, in particular, the package thereof is not always set in the predetermined position within the housing. Because the optical axis of the subassembly, namely, the position of the sleeve is first determined with respect to the housing, the package of the subassembly occasionally causes a gap to the housing body, or is fit to the housing body as inducing the mechanical stress in the connecting portion between the sleeve and the package. The former case is unable to show the good heat transfer therebetween, while the latter case brings the degradation in the reliability.

The present invention provides a new arrangement of the optical receptacle and the optical subassembly to the housing body of the transceiver, in which the optical coupling between the optical fiber inserted into the optical receptacle and the subassembly may be maintained and the good heat dissipating function of the subassembly may be kept.

SUMMARY OF THE INVENTION

An optical transceiver according to the present invention comprises; a receptacle member, an optical subassembly, a holder and a housing. The receptacle member has a cavity, which receives an optical connector, and an opening that connects and exposes to the cavity. The optical assembly has a sleeve and the package installing a semiconductor optical device. The optical assembly may optical couple with the optical fiber by inserting the sleeve thereof into the opening of the receptacle member and mating the sleeve with the optical connected in the cavity. The holder, put between the receptacle member and the optical subassembly, holds the receptacle member. The housing installs the receptacle member, the optical subassembly, and the holder therein, and assembles the holder in a position. The optical transceiver of the present invention has a feature that the position of the holder with respect to the housing is adjustable such that the package of the optical subassembly fits to the housing.

The housing provides a side wall with a groove, while the holder has a U-shape with a pair of arm and a bridge connecting the arms to hold the receptacle member within this U-shape. The tip of the arms may provide an outer rib that is received in the groove of the receptacle member and moveable in the groove. Thus, the receptacle member, which is held by the holder and assembles the optical subassembly, may slide in up and down by the outer rib of the holder sliding within the groove.

The optical subassembly may include a transmitting optical subassembly (TOSA) and a receiving optical subassembly (ROSA). The receptacle member may provide two openings each corresponding to the TOSA or the ROSA, and the holder in the bridge thereof may also two openings corresponding to the openings of the receptacle member. The sleeves of the TOSA or the ROSA are inserted into respective openings of the receptacle member passing through openings of the bridge such that the receptacle member and the optical subassemblies put the holder therebetween and the arms of the holder put the receptacle member therebetween.

The receptacle member and one of the TOSA and the ROSA may rotate with the other of the TOSA and the ROSA as a center of the rotation to fit the package of the subassemblies to the housing. Thus, according to the configuration of the tri-part assembly including the optical subassembly, the receptacle member, and the holder, the packages of the TOSA and the ROSA may be fit to the housing to secure the thermal coupling therebetween as securing the optical configuration such as the interval between the TOSA and the ROSA and the positional relation of the TOSA and the ROSA to the receptacle member.

DESCRIPTION OF PREFERRED EMBODIMENTS

Figure 1:
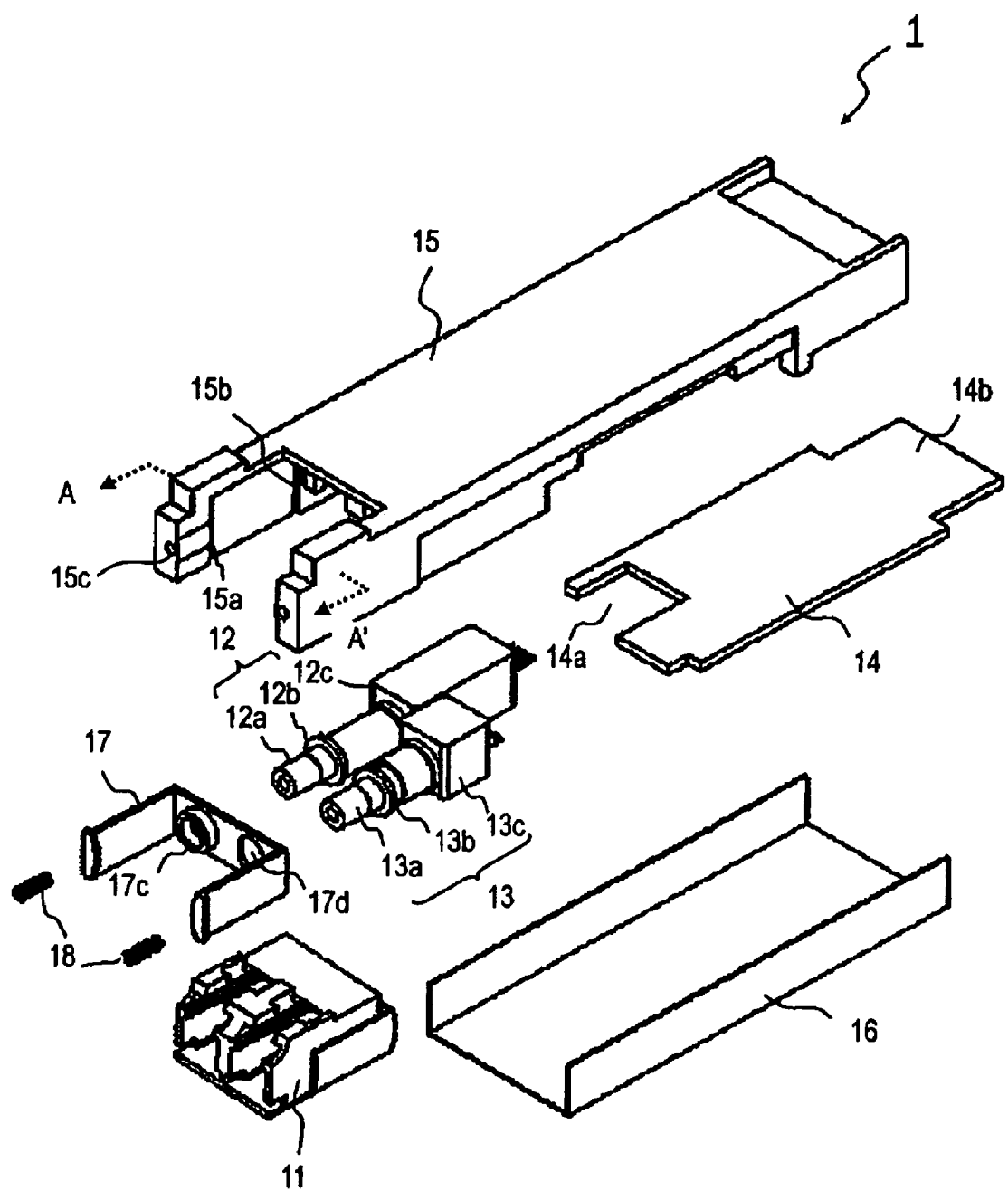
FIG. 1 is an exploded view of the optical transceiver according to the present invention.

FIG. 1 is an exploded view of an optical transceiver according to the present invention. The optical transceiver 1 includes a transmitting optical subassembly (TOSA) 12, a receiving optical subassembly (ROSA) 13. Both assemblies, 12 and 13, comprise a package, 12c and 13c, with the so-called butterfly type, and a sleeve, 12a and 13a, protruding from one side of the package. The optical transceiver 1 further includes a receptacle member 11 for receiving an optical connector, a holder 17, and a substrate 14. These members, 11, 14 and 17, are installed within a space formed by upper and lower housings, 15 and 16. Both housings, 15 and 16, are made of metal. For the upper housing 15 may be made of resin. The receptacle member 11 may be also made of resin, and the holder 17 may be made of either resin or metal, as explained in later.

A plurality of lead pins, 12d and 13d, protruding from a rear of the TOSA 12 and the ROSA 13 connects them to an electronic circuit mounted on the substrate 14. To solder the lead pins, 12d and 13d, with wiring patterns on the substrate 14 may perform the electrical communication between subassemblies, 12 and 13, and the electronic circuit. In the present embodiment, since the TOSA 12 installs auxiliary device such as thermoelectric device in the package 12c, the size thereof becomes greater than that of the ROSA 13. Accordingly, the substrate 14 provides a cutting 14a to install the widened package of the TOSA 12.

The TOSA 12 and the ROSA 13 are, as explained hereinbelow, connected to the substrate 14 via the lead pins, 12d and 13d, after assembled with the receptacle member 11 via the holder 17. This assembly, which includes two subassemblies, the holder 17, and the receptacle member 11, are installed within the space formed by the housings, 15 and 16. At that time, the upper surface of the packages, 12c and 13c, are necessary to fit to a ceiling of the upper housing 15, because the heat generated in a semiconductor device mounted in the package, 12c and 13c, is necessary to be conducted in effective to the upper housing 15.

On the other hand, the position of the TOSA 12 and that of the ROSA 13 are determined by putting both subassemblies together with the receptacle member 11 and fitting the receptacle member 11 to the housing 15. The former assembling, namely, the assembling the subassemblies with the receptacle member 11 is preformed only by inserting their sleeves, 12a and 13a into the openings formed in the rear wall 11d of the receptacle member 11, which determines the relative position between the sleeves, 12a and 13a, and the receptacle member 11. However, the former assembling does not always determine the relative position between the packages, 12c and 13c, and the receptacle member 11. In particular, depending on an optical alignment between the optical device within the packages, 12c and 13c, and the sleeves, 12a and 13b, it may occur that a distance from the axis of the sleeves, 12a and 13b, to the upper surface of the packages, 12c and 13c, is widely scattered in respective subassemblies.

When the receptacle member 11 with such subassemblies is fit to the upper housing 15, the upper surface of the package, 12c or 13c, may be floated from the ceiling of the upper housing 15, or a mechanical stress may be induced between the package, 12c or 13c, and the sleeve, 12a or 13a, caused by the pressing the upper surface of the package, 12c or 13c, to fit to the ceiling, which degrades the reliability of the transceiver 1. In the present transceiver, the assembly of the receptacle member 11 with the upper housing 15 may be carried out indirectly via the holder 17 such that the fitting of the receptacle member 11 to the upper housing 15 may be performed as adjusting the position of the receptacle member 11, accordingly, the upper surface of the package, 12c or 13c, may fit to the ceiling of the upper housing 15.

Next, the assembly of the TOSA 12 and the ROSA 13 with the receptacle member 11, and that of the receptacle member 11 with the upper housing 15 will be described in detail.

Figure 2:
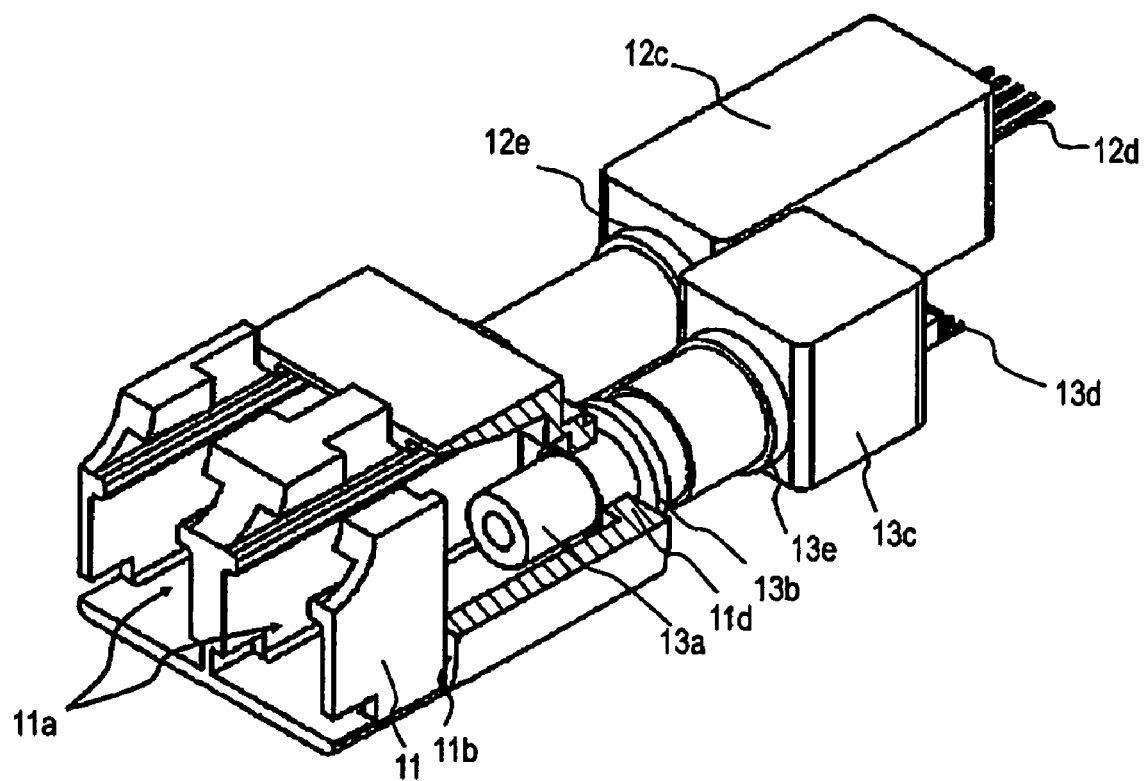
FIG. 2 is a partially broken schematic diagram that shows the receptacle member assembling the transmitting optical subassembly and the receiving optical sub assembly, where the holder is omitted in FIG. 2.

FIG. 2 is a schematic diagram, a part of which is broken to illustrate the inside, showing the receptacle member setting the TOSA and ROSA. Here, FIG. 2 omits the holder 17. The assembly is carried out as follows: First, the sleeves, 12a and 13a, of the TOSA 12 and the ROSA 13 are inserted into the openings formed in the rear wall 11d of the receptacle member 11 as passing through the opening provided in the holder 17. The opening in the holder 17 corresponds to that formed in the rear wall 11d of the receptacle member 11. The penetration depth of the sleeves, 12a and 13a, into the openings of the receptacle member 11 may be determined by abutting the flanges, 12b and 13b, provided in a halfway of the sleeves, 12a and 13a, against the rear wall 11d of the receptacle member 11, which operates as a stopper. That is, the penetration depth, which corresponds to the protruding length of the sleeves, 12a and 13a, into the cavity 11a, follows the standard of the optical connector. In the present embodiment shown in FIG. 2, a type of the LC-connector is illustrated. By mating the optical connector with the receptacle member 11, the optical fiber attached to the optical connector can optically couple with the optical devices installed within the packages, 12c and 13c, via the sleeves, 12a and 13a.

The receptacle member 11 shown in FIGS. 1 and 2 is formed by resin molding. It is preferable to coat the surface of the receptacle member 11 with a metal such as Ni to enhance the EMI tolerance. The receptacle member 11 may be made of metal die-casting.

Figure 3:
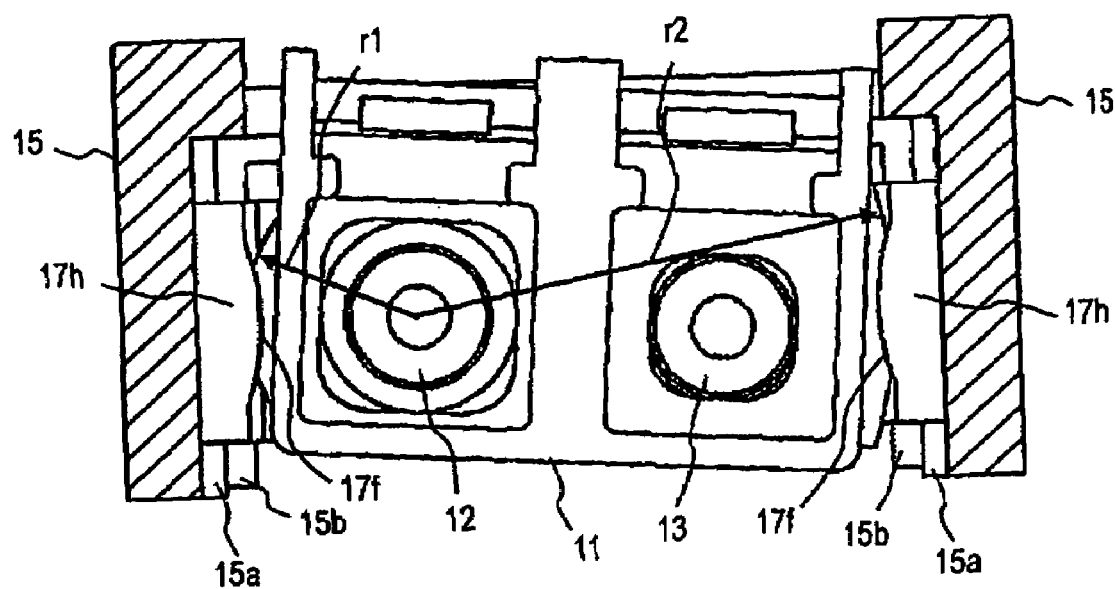
FIG. 3 is a cross sectional view taken along the line A-A' in FIG. 1, which shows the receptacle member assembled with the transmitting optical subassembly and the receiving optical subassembly fit to the upper housing indirectly via the holder.

Next, the receptacle member 11 thus assembled with the TOSA 12 and the ROSA 13 is set to the upper housing 15. FIG. 3 is a cross sectional view of the receptacle member 11 with subassemblies taken along the line A-A' in FIG. 1. Among the tri-part assembly, which means the receptacle member 11 assembled with the subassemblies, 12 and 13, and the holder 17 put between the rear wall 11d of the receptacle member 11 and the flange portions, 12b and 13b, of the subassemblies, the holder 17 is directly fixed to the housing 15 as covering the sides of the receptacle member 11, while the receptacle member 11 and the subassemblies, 12 and 13, are indirectly fixed to the upper housing 15 via the holder 17.

That is, the holder 17, as shown in FIG. 4, includes a pair of arms 17b and a bridge 17a connecting these arms 17b, each arm 17b providing an inner rib 17f extruding inward and an outer rib 17g extruding outward at the tip thereof. These two ribs, 17f and 17g, forms an end surface 17h and an abutting surface 17j opposite to the end surface 17h with respect to the inner rib 17f. The receptacle member 11 is assembled with the holder 17 such that a step 11b formed in the side thereof shown in FIG. 2 abuts against this abutting surface 17j, while the rear wall 11d thereof comes in contact to the bridge 17a. That is, the receptacle member 11 is assembled with the holder 17 so as to be put between the inner rib 17f and the bridge 17a of the holder 17.

Moreover, the arm 17b may configure a concave surface 17k in a portion facing to the other arm 17b, and at least a portion of the side of the receptacle member 11 may form a convex surface that fits with the concave surface 17k of the holder 17. The combination of the concave surface 17k of the holder 17 and the convex side of the receptacle member 11 may prevent the receptacle member 11 from swinging the front portion thereof up and down.

Further, by setting the concave surface 17k of the arm 17b and the convex side of the receptacle member 11, both in the side of the TOSA 12, an equidistance surface from the axis of the TOSA 12 with a radius r1, while, the concave surface 17k of the opposite arm 17b and the side wall of the receptacle member 11 opposite to the above an equidistance surface with a radius r2, not only swinging the front portion of the receptacle member 11 up-and-down may be prevented but also the rotation of the receptacle member 11 around the axis of the TOSA 12 may become smooth.

The outer rib 17g is set within a groove 15a formed inside of the side wall of the upper housing 15. Accordingly, the holder 17 may slide within the groove 15a in vertical with respect to the upper housing 15. Thus, because of the receptacle member 11 being assembled with the holder 17 so as to rotate with the axis of the TOSA 12 as the center of the rotation, the upper surface of the packages, 12c and 13c, of the subassemblies, 12 and 13, may fit to the ceiling of the upper housing 15 while maintaining the distance between axes of the TOSA 12 and the ROSA 13.

Figure 4A:
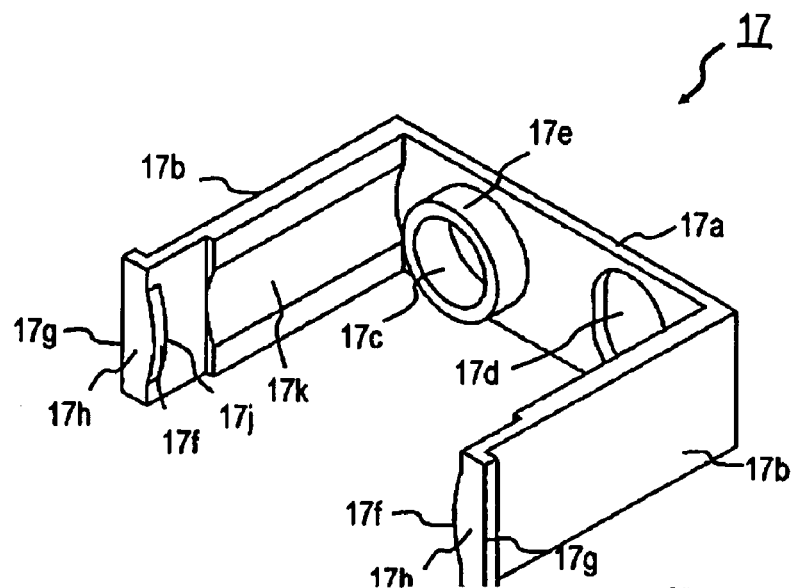
FIG. 4A shows a holder according to the first example.
Figure 4B:
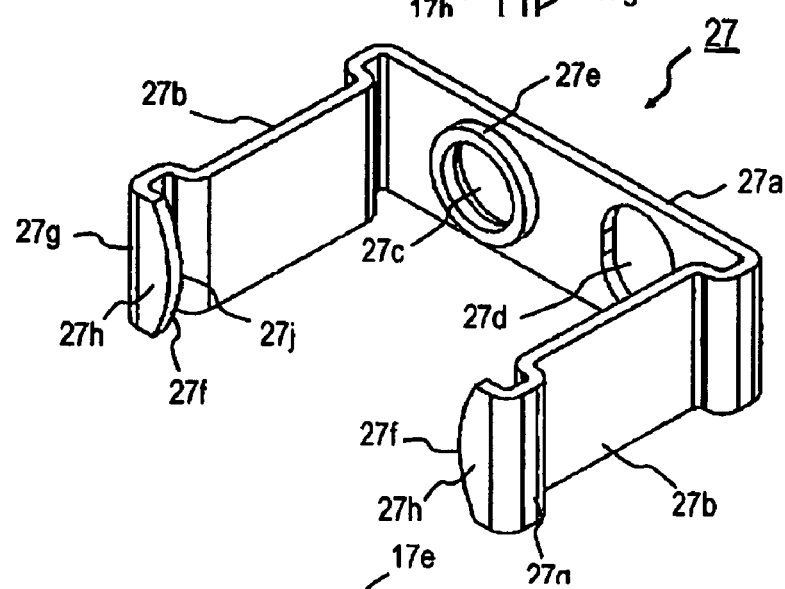
FIG. 4B is another holder according to the second example.
Figure 4C:
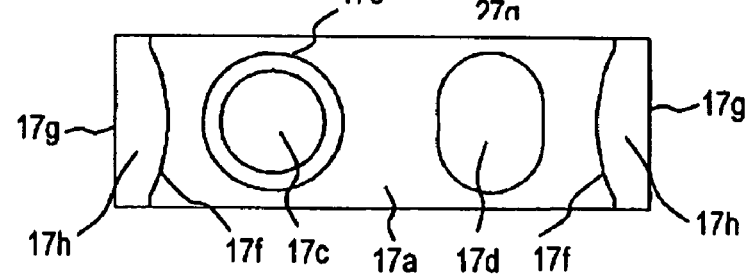
FIG. 4C is the front view of the holder of the first example.

FIGS. from 4A to 4C illustrate the holder 17, which configures the so-called U-shape with the pair of arms 17b and the bridge 17a connecting these arms 17b. FIG. 4A shows a holder 17 made of resin, while FIG. 4B shows another holder 27 made of metal plate, and FIG. 4C is a front view of the holder 17 shown in FIG. 4A.

The bridge 17a forms a pair of openings, 17c and 17d, which corresponds to openings formed in the rear wall 11d of the receptacle member 11 when the holder 17 is fit thereto. The sleeves, 12a and 12b, of the subassemblies, 12 and 13, pass through these openings, 17c and 17d, in the bridge 17a and the rear wall 11d of the receptacle member 11. As shown in FIG. 4C, the opening 17d, through which the sleeve 13a of the ROSA 13 passes, has an extended circular with a pair of flat portion in both sides thereof to secure a movable room for the sleeve 13a of the ROSA 13.

On the other hand, the opening 17c for the TOSA 12 has a circular and forms a pipe 17e in the peripheral thereof that protrudes inward. On the peripheral of the opening formed in the rear wall 11d of the receptacle member 11 provides a hollow rim to receive the pipe 17e, which may tentatively assemble the holder 17 with the receptacle member 11. By putting the holder 17 between the flanges, 12b and 13b, and the rear wall 11d of the receptacle member 11, the holder 17 is finally fixed to the receptacle member 11.

The sleeve 12b of the TOSA 12 can not slide within the opening 17c for the TOSA 12 because the shape thereof 17a is circular. On the other hand, since that 17d for the ROSA 13 is the extended circular, the sleeve 13a of the ROSA 13 can slide within the opening 17d by the extended circle. That is, after the tri-part assembly is completed, the ROSA 13 and the receptacle member 11 can rotate with the axis of the TOSA 12 as a center of the rotation. In another aspect, the receptacle member 11 in the side of the ROSA 13 may slide within a range of the extended circle even the tri-part assembly is completed.

Moreover, as mentioned earlier, by setting the side of the receptacle member 11 convex and the inside surface of the arm 17b concave so as to fit the convex of the receptacle member 11 with the radius from the center of the TOSA axis, the rotation of the receptacle member 11 within the holder 17 may be smooth. The diameter of the sleeves, 12a and 12b, is about 3 mm, while the major axis of the opening 17d for the TOSA 12 is set about 4 mm. Assuming the interval between the TOSA 12 and the ROSA 13 in the axis thereof is 6.25 mm, which follows the standard of the LC-connector, the room for sliding the receptacle member 11 in the side of the ROSA 13 is secured about ±0.5 mm.

Generally, the TOSA 12 generates larger heat than the ROSA 13 because the TOSA installs a device that generates large heat, such as a thermoelectric device. Therefore, the heat dissipating efficiency for the TOSA 12 should be considered prior to the ROSA 13. In the tri-part assembly of the present invention, after fitting this tri-part assembly to the upper housing 15 and even when the upper surface of the package 12c of the TOSA 12 floats from the ceiling of the upper housing 15, the effective heat conduction to the upper housing 15 from the TOSA 12 and the ROSA 13 may be secured by, first, sliding this tri-part assembly via the holder 17 in vertical, next, rotating the receptacle member 11 accompanied with the TOSA 12 around the ROSA 13 to fit the upper surface of the packages, 12c and 13c, of not only the TOSA 12 but also the ROSA 13 to the housing 15.

Generally, when a gap exists between two articles, the heat transfer coefficient therebetween reduces by about ½ to ⅓ compared to the case that two articles come in contact to each other. To fill the gap with thermal grease may recover the heat transfer coefficient to a certain extent. However, when the gap exceeds 0.5 mm, it may be impossible, even filling the gap with the thermal grease, to recover the heat transfer coefficient. In the present invention, the gap between the upper surface of the packages, 12c and 13c, and the ceiling of the upper housing 15 may become smaller than 0.15 mm by applying the holder 15 movable in vertical with respect to the upper housing 15 and the receptacle member 11 able to rotate around the TOSA 12. Moreover, by filling the thermal grease between the packages, 12c and 13c, and the upper housing 15, the superior thermal coupling between the upper surface, which functions as a heat dissipating surface, of the packages 12c and the upper housing 15 can be realized.

Another holder 27 shown in FIG. 4B has the same configuration and the function with the holder 17 shown in FIG. 4A.

Figure 5:
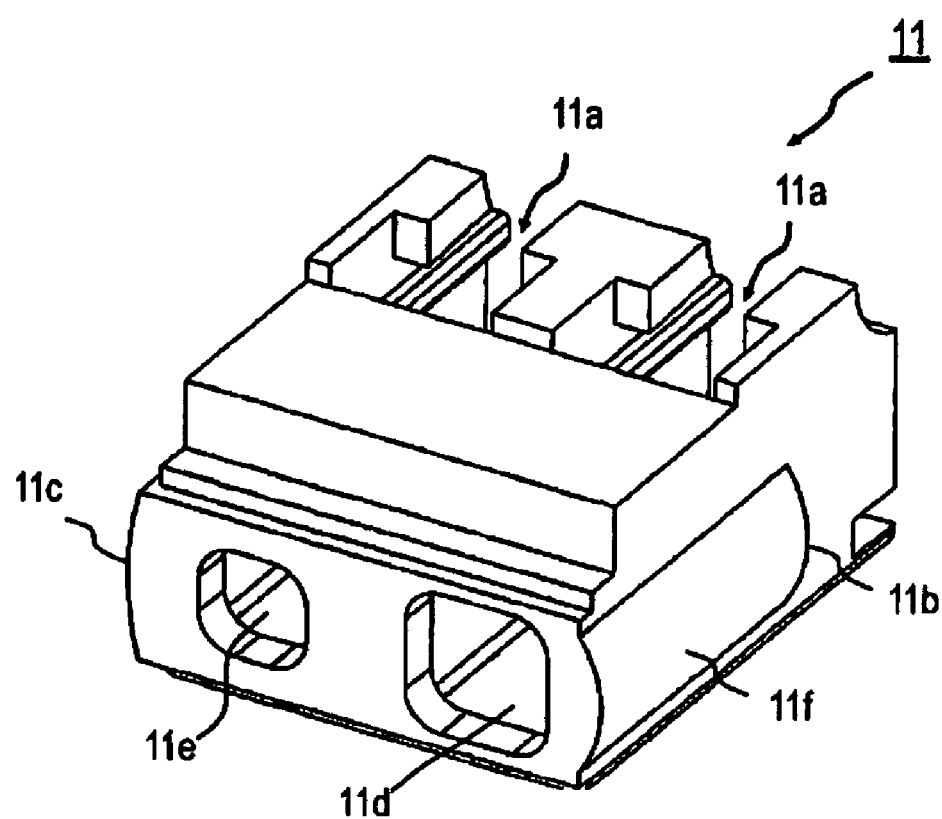
FIG. 5 is a perspective view of the receptacle member.

FIG. 5 is a perspective drawing of the receptacle member 11 according to the present invention. The receptacle member 11 shown in FIG. 5 has curved side walls, preferably, the receptacle member 11 has a side wall 11f with the radius r1 for the side of the TOSA 12 while another side wall 11a with the radius r2 for the side of the ROSA 13, which is different from and greater than the radius r1. Thus, the receptacle member 11 may rotate around the axis of the TOSA 12 till the upper surface of the package 13c of the ROSA 13 comes in contact to the upper housing 15. Since the side walls of the receptacle member 11 have the curved surface with the radii of r1 and r2, while, the inner surfaces of the arms 17b corresponding to these convex side walls, 11f and 11c, have the concave surfaces with the radii of r1 and r2, respectively, the rotation of the receptacle member 11 can become smooth enough.

Although the receptacle member 11 shown in FIG. 5 has the opening in the rear wall 11d thereof with a rectangular shape for the TOSA 12 and the ROSA 13, the openings may be circular, or may be extended circular with the pair of flat portions. By setting the distance between these flat portions slightly smaller than the diameter of the sleeve 13a, and setting the radius of two arched portions connecting these flat portions slightly greater than the diameter of the sleeve 13a the sleeve 13a of the ROSA 13 may be not only easily inserted into the opening but also rigidly secured to the receptacle member 11. Moreover, by forming the receptacle member 11 and the sleeve 13a of the ROSA 13 with an electrically conductive material, or by coating the surface thereof with a metal even when both members are made of insulating material, the EMI shielding may be enhanced by grounding the conductive receptacle member 11 with the conductive sleeve 13b.

Figure 6:
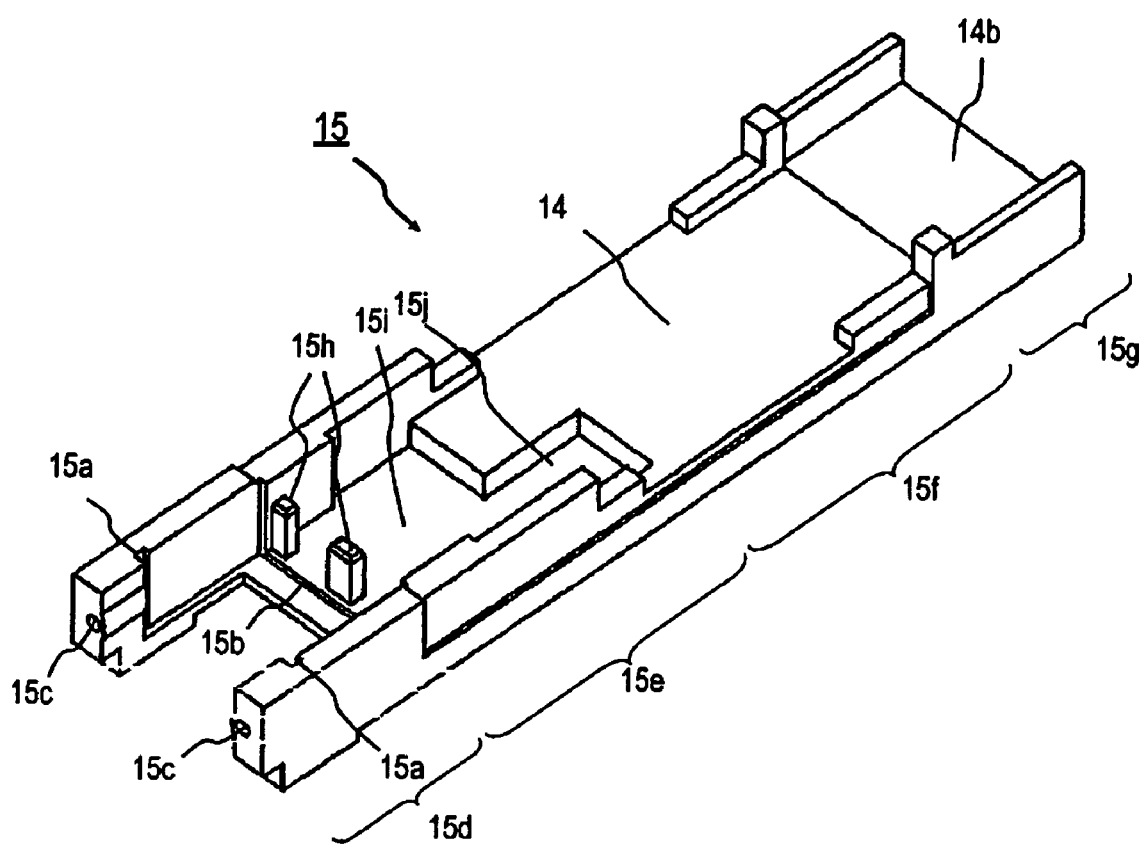
FIG. 6 is a perspective view showing the upper housing installing the substrate thereon.

FIG. 6 shows the upper housing 15 with the substrate 14 thereon, which is just before the installing of the tri-part assembly of the receptacle member 11, the TOSA 12 and the ROSA 13, and the holder 17.

The upper housing 15 includes a receptacle mounting portion 15d, a subassembly mounting portion 15e, a substrate mounting portion 15f, and a plug forming portion 15g.

The receptacle mounting portion 15d provides a space surrounded by the pair of side walls, into which the receptacle 11 is installed. The above and below of the receptacle mounting portion 15d is opened. FIG. 6 illustrates the upper housing 15 in upside down for the practical appearance. On the front end of the side wall is formed with a screw hole 15c to fix the holder 17 to the upper housing 15. The inside of the side wall, as already explained, forms a groove 15a to receive the outer rib 17g of the holder 17. The outer rib 17g may slide within this groove 15a, thus, the tri-part assembly may adjust its vertical position with respect to the upper housing 15.

The subassembly mounting portion 15e forms a space surrounded by the pair of side walls and the ceilings, 15i and 15j, which is processed in flat to come to the upper surface of the packages, 12c and 13c, of the TOSA 12 and the ROSA 13 in close contact to secure the heat dissipating path from the TOSA 12 and the ROSA 13. Between the subassembly mounting portion 15e and the receptacle mounting portion 15d is formed with a step 15b and behind this step 15b is provided posts 15h in a center and both sides thereof. The step 15b abuts against the bridge 17a of the holder 17. Since the outer rib 17g engages with the groove 15a while the bridge 17a thereof abuts against this step 15b, the holder 17 is reliably positioned in the longitudinal direction of the upper housing 15 between the groove 15a and the step 15b.

The three posts 15h abut against the rear surface of the flanges, 12b and 13b, to position the TOSA 12 and the ROSA 13 in the longitudinal direction of the housing 15. That is, by putting the flanges, 12b and 13b, between these three posts 15h and the holder 17, the TOSA 12 and the ROSA 13 are securely positioned in the longitudinal direction of the upper housing. In addition to the positioning above, by the sliding function of the holder 17 to the housing 15 and the rolling function of the receptacle member 11 to the holder 17, the upper surface of the packages of the TOSA 12 and the ROSA 13 can be fit to the ceiling of the subassembly mounting portion 15e.

The substrate mounting portion 15f positions behind the subassembly mounting portion 15e to connect the lead pins, 12d and 13d, of the subassemblies, 12 and 13, in electrical to the wiring pattern on the substrate 14. As shown in FIG. 1, the substrate 14 is mounted on the side wall of the housing 15 by, cutting a center of the side wall of the housing 15, while, cutting the front and rear sides of the substrate 14 to extrude the center thereof, and setting this extruding portion of the substrate 14 within the cutting portion of the side wall of the housing 15. Since the front and rear end of the extruding portion of the substrate 14 abut against the side wall of the housing 15, the substrate 14 is restricted to move in longitudinal in the housing 15. For the transverse direction, the cutting portions in the front and rear sides of the substrate 14 are put between the side walls of the housing 15, thus the substrate 14 is also prevented from getting out of the position in the transverse direction.

The substrate 14 is thus fixed to the housing 15, even when the electrical plug 14b formed in the rear end of the substrate 14 is to be mated with the electrical connector within the cage, the stress applied at the mating is buffered by this engagement structure between the housing 15 and the substrate 14 to release the connection between the lead pins, 12d and 13d, and the substrate 14 from the stress. The electrical plug 14b, positioned in the plug formed portion 15g of the housing 15, is formed by the wiring pattern on the substrate by configuring in a predetermined shape.

Figure 7:
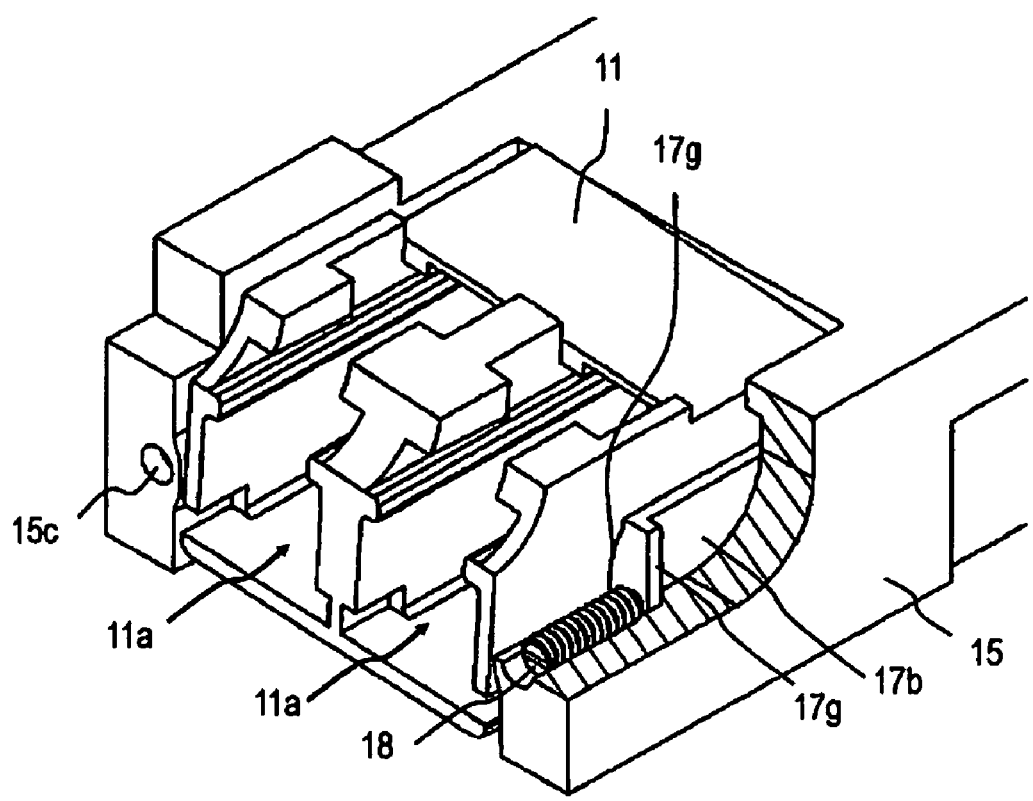
FIG. 7 is a perspective view of the receptacle member assembled with the optical subassemblies fit to the upper housing.

FIG. 7 is a perspective view of the tri-part assembly fixed to the upper housing 15 with two screws 18. Two screws 18 are inserted into screw holes 15c each formed in the front end of the upper housing 15 and abut against the flat surface 17h in the front end of the arms 17b of the holder 17 to fix the holder 17 to the housing 15 by pressing backward. Although the outer rib 17g of the holder 17 is set within the groove 15a of the housing 15, the fitting therebetween is loose because the outer rib 15g slides within the groove 15a. Accordingly, by pressing the holder 17 backward with the screw 18, the rear wall 11d of the receptacle member 11 may abut against the step 15b formed between the receptacle mounting portion 15d and the subassembly mounting portion 15e of the upper housing 15 to fix the tri-part assembly to the housing 15. Even after the fixing of the holder 17 to the housing 15, the receptacle member 11 and the subassemblies, 12 and 13, may be rotated around the axis of the TOSA 12. The screw 18 is preferable to have a configuration that, in an initial condition just after the formation of the upper housing 15, and a thread thereof is not provided and the first insertion and driving makes the thread at the same time of the fixing of the holder 17.

Subsequently, the lower housing 16 is attached to the upper housing 15 to complete the optical transceiver 1 of the present invention. As explicitly shown in FIG. 7, even the receptacle member 11 is inclined with respect to the upper housing 15, the dimensions corresponding to the optical connector to be inserted into this receptacle member 11, such as inner dimension of the cavity and the interval between the TOSA 12 and the ROSA 13, may be maintained. At the same time, although not shown in FIG. 7, the upper surface of the packages, 12c and 13c, of the TOSA 12 and the ROSA 13 may securely fit to the ceiling of the upper housing 15, which may facilitate the heat dissipating function the TOSA 12 and the ROSA 13.

While specific embodiments of the present invention have been described and illustrated, it will be apparent to those skilled in the art that numerous modifications and variations can be made without departing from the scope of the invention as defined in the appended claims.

What is claimed is:

1. An optical transceiver matable with an optical connector having an optical fiber attachable thereto, said optical transceiver comprising:
   a receptacle body having two cavities, each with an associated opening in a rear wall thereof, each cavity being arranged for receiving an optical connector;
   a pair of optical subassemblies each having a sleeve and a package that installs a semiconductor optical device, each optical subassembly being optically coupleable with an optical fiber attached to an optical connector received in one of the cavities by inserting its sleeve into the corresponding opening of the receptacle body and mating with an optical connector in the one cavity;
   a holder put between the receptacle body and the optical subassembly for securing the receptacle body, the holder providing a pair of arms and a bridge connecting the arms to form an U-shape, each arm providing an outer rib in a tip thereof, the bridge providing a pair of openings that align with the openings of the receptacle body, one of the openings of the bridge having an extended circular shape and the other of openings of the bridge having a circular shape, the sleeve of each optical subassembly being inserted into one opening in the rear wall of the receptacle body through its aligned opening in the bridge such that each subassembly and the receptacle body sandwich the holder; and
   a housing that installs the receptacle body, the optical subassembly and the holder therein, the housing providing a primary surface for installation of the optical subassemblies thereon and a pair of side walls accepting the receptacle body and the holder therebetween, each side wall providing a groove in an inner surface thereof,
   wherein the holder, the receptacle body, and the optical subassemblies are slidable vertically with respect to the primary surface of the housing by sliding the outer rib within the groove of the side wall of the housings, and
   wherein the receptacle body is rotatable around the optical subassembly sleeve inserted into the opening of the holder with the circular shape such that each package of each optical subassembly contacts the primary surface to conduct heat generated by the optical subassembly to the housing.

2. The optical transceiver according to claim 1,
   wherein the opening provided in the bridge of the holder with the circular shape has a pipe therearound, and the opening provided in the rear wall of the receptable body corresponding to the opening of the holder with the circular shape provides a hollow rim therearound to receive the pipe of the holder.

3. The optical transceiver according to claim 1,
   wherein each arm of the holder provides an inner rib in the tip thereof, and
   wherein the receptacle body has a step abutting against the inner rib to put the receptacle body between the bridge and the inner rib of the holder.

4. The optical transceiver according to claim 1,
   wherein each arm forms a concave surface facing the other arm and
   wherein the receptacle body provides a convex surface in the side wall thereof to fit the concave surface of the arm.

5. The optical transceiver according to claim 4,
   wherein one of arms of the holder provides a first concave surface with a first radius and the other of arms of the holder provides a second concave surface with a second radius greater than the first radius, and
   wherein one side of the receptacle body provides a first convex surface with the first radius and the other side of the receptacle body provides a second convex surface with the second radius.

6. The optical transceiver according to claim 1,
   wherein the housing provides a screw hole piercing from a front end thereof to the groove of the side wall of the housing, and
   wherein the outer rib of the holder forms a tip surface butted with a screw inserted into the screw hole of the housing.

7. The optical transceiver according to claim 1,
   wherein the receptacle body is made of resin coated with metal.

8. The optical transceiver according to claim 1,
   wherein the holder is made of resin.

9. The optical transceiver according to claim 1,
   wherein the holder is made of metal plate.

10. An optical transceiver, comprising:
    a receptacle body with two cavities and an opening in communication with each cavity;
    a pair of optical subassemblies each having a sleeve and a box shape package, each sleeve protruding into one cavity through one opening of the receptacle body, the box shape package of each optical subassembly having a semiconductor device therein that generates heat;

a holder provided between the receptacle body and the pair of optical subassemblies, the holder holding the receptacle body; and a housing with a primary surface supporting the receptacle body and the holder, the housing installing the pair of optical subassemblies thereon, wherein the holder assembled with the receptacle body and the pair of optical subassemblies is vertically slidable within with respect to the primary surface of the housings, and wherein the receptacle body is rotatable around one of the sleeves such that each box shape package comes into thermal contact with the primary surface of the housing to conduct heat generated by the semiconductor device to the housing.

11. The optical transceiver according to claim 10, wherein the holder provides a pair of arms and a bridge connecting the arms, each arm providing an outer rib in a tip portion thereof, the arms placing the receptacle body therebetween, wherein the housing provides a pair of side walls so as to put the receptacle body and the arms of the holder therebetween, each side wall providing a groove, and wherein the holder with the receptacle body and the pair of optical subassemblies are vertically slidable with respect to the primary surface of the housing as the groove of the side wall receives the outer rib of the holder.

12. The optical transceiver according to claim 10, wherein the holder provides a pair of arms and a bridge connecting the arms, the bridge providing a pair of openings, one of the openings in the bridge having an extended circular shape and the other of the openings in the bridge having a circular shape, each sleeve of the optical subassemblies passing through the corresponding openings in the bridge and the opening in the receptacle body to protrude into the cavity, and wherein the receptacle body is rotatable with respect to the holder around the opening with the circular shape in the bridge.

* * * * *